United States Patent
Punnoose et al.

(10) Patent No.: US 8,656,453 B2
(45) Date of Patent: Feb. 18, 2014

(54) SECURITY SYSTEMS AND/OR METHODS FOR CLOUD COMPUTING ENVIRONMENTS

(75) Inventors: Vinay Punnoose, Bangalore (IN); Kayiti Devanandam, Bangaluru (IN); Satish Kumar Joshi, Bangalore (IN); Aditya Babu Nampally, Bengaluru (IN)

(73) Assignee: Software AG, Darmstadt (DE)

( * ) Notice: Subject to any disclaimer, the term of this patent is extended or adjusted under 35 U.S.C. 154(b) by 557 days.

(21) Appl. No.: 12/926,330

(22) Filed: Nov. 10, 2010

(65) Prior Publication Data
US 2012/0116782 A1 May 10, 2012

(51) Int. Cl.
H04L 29/06 (2006.01)

(52) U.S. Cl.
USPC .......... 726/1; 705/1.1; 707/607; 707/608; 709/203; 709/217; 709/218

(58) Field of Classification Search
None
See application file for complete search history.

(56) References Cited

U.S. PATENT DOCUMENTS

| | | | |
|---|---|---|---|
| 6,643,650 B1 * | 11/2003 | Slaughter et al. | 707/999.004 |
| 7,130,885 B2 * | 10/2006 | Chandra et al. | 709/206 |
| 7,340,500 B2 * | 3/2008 | Traversat et al. | 709/201 |
| 7,441,265 B2 * | 10/2008 | Staamann et al. | 726/4 |
| 7,669,227 B2 * | 2/2010 | Malcolm | 726/1 |
| 7,949,677 B2 * | 5/2011 | Croft et al. | 707/781 |
| 8,099,758 B2 * | 1/2012 | Schaefer et al. | 726/1 |
| 8,131,281 B1 * | 3/2012 | Hildner et al. | 455/418 |
| 8,341,270 B2 * | 12/2012 | Mazzaferri et al. | 709/227 |
| 8,387,870 B2 * | 3/2013 | Trotter | 235/380 |
| 2010/0115046 A1 | 5/2010 | Reddy Byreddy et al. | |

OTHER PUBLICATIONS

Ramgovind, S; Eloff, MM; Smith. The Management of Security in Cloud Computing. Information Security for South Africa Conference. Pub. Date: 2010. Relevant pp. 1-7. Found on the World Wide Web at: http://ieeexplore.ieee.org/stamp/stamp.jsp?tp=&arnumber=5588290.*
Dean, et al., "Map Reduce: Simplified Data Processing on Large Clusters", Google Inc., 2004, pp. 1-13.
Kourpas, "Grid Computing: Past, Present and Future", Jun. 2006, IBM Corporation, Jun. 2006, pp. 1-22.
Roy et al., "Airavat: Security and Privacy for MapReduce", The University of Texas at Austin, pp. 1-16.
A. Dan et al., "Business-to-Business Integration with tpaML and a Business-to-Business Protocol Framework," IBM Systems Journal, vol. 40, No. 1, Jan. 2001, pp. 68-90.

* cited by examiner

*Primary Examiner* — Cordelia Zecher
*Assistant Examiner* — Jeremiah Avery
(74) *Attorney, Agent, or Firm* — Nixon & Vanderhye PC (57) ABSTRACT

Certain example embodiments described herein relate to security systems and/or methods for cloud computing environments. More particularly, certain example embodiments described herein relate to the negotiation and subsequent use of Trading Partner Agreements (TPAs) between partners in a Virtual Organization, the TPAs enabling resources to be shared between the partners in a secure manner. In certain example embodiments, TPAs are negotiated, an algorithm is executed to determine where an executable is to be run, the resource is transferred to the location where it is to be run, and it is executed—with the TPAs collectively defining a security policy that constrains how and where it can be executed, the resources it can use, etc. The executable may be transferred to a location in a multipart (e.g., SMIME) message, along with header information and rights associated with the executable.

26 Claims, 5 Drawing Sheets

Fig. 1

```xml
<TradingPartnerAgreement>
    <TradingPartners>
        <UniqueID>SAG-B2B20100112</UniqueID>
        <UniqueID>MIG-B2B19970243</UniqueID>
    </TradingPartners>
    <Status>Negotiating</Status>
    ...
    ...
    <Security>
        <Transport>HTTPS</Transport>
        <TradingPartner>
            <ID> SAG-B2B20100112</ID>
            <DigitalSignatureAuthentictionSupport value='true'/>
            <CommonAlgorithm>md5</CommonAlgorithm>
            <Keys>
                <Vendor>VeriSign</Vendor>
            </Keys>
            <CodeLevelSecurity>
                <Permission class="FilePermission">
                    <target>C:\IntegrationServer\dfs </target>
                    <actions>read write execute delete</actions>
                </Permission>
                <Permission class="SocketPermission">
                    <target>111.222.333.444</target>
                    <actions>accept connect</actions>
                </Permission>
            </CodeLevelSecurity>
        </TradingPartner>
        <TradingPartner>
            <ID> MIG-B2B19970243</ID>
            <DigitalSignatureAuthentictionSupport value='true'/>
            <CommonAlgorithm>md5</CommonAlgorithm>
            <Keys>
                <Vendor>VeriSign</Vendor>
            </Keys>
            <CodeLevelSecurity>
                <Permission class="FilePermission">
                    <target>D:\IntegrationServer\dfs </target>
                    <actions>read write execute</actions>
                </Permission>
                <Permission class="SocketPermission">
                    <target>111.222.333.555</target>
                    <actions>accept connect</actions>
                </Permission>
            </CodeLevelSecurity>
        </TradingPartner>
    </Security>
</TradingPartnerAgreement>
```

SECURITY SYSTEMS AND/OR METHODS FOR CLOUD COMPUTING ENVIRONMENTS

FIELD OF THE INVENTION

Certain example embodiments described herein relate to security systems and/or methods for cloud computing environments. More particularly, certain example embodiments described herein relate to the negotiation and subsequent use of Trading Partner Agreements (TPAs) between partners in a Virtual Organization, with the TPAs enabling resources to be shared between the partners in a secure manner. In certain example embodiments, TPAs are negotiated, an algorithm is executed to determine where an executable is to be run, the resource is transferred to the location where it is to be run, and it is executed—with the TPAs collectively defining a security policy that constrains how and where it can be executed, the resources it can use, etc.

BACKGROUND AND SUMMARY OF EXAMPLE EMBODIMENTS OF THE INVENTION

Cloud computing is a style of computing in which dynamically scalable and often virtualized resources are provided as a service over the Internet. Cloud computing may sometimes accelerate application performance, help enable companies to quickly deliver business results, achieve greater productivity, realize a faster time to market, and result in increased customer satisfaction. It also provides the ability to store, share, and analyze large amounts of data, thereby helping to ensure that people have access to information at the right time which, in turn, can improve decision-making, employee productivity, and collaboration.

With the incremental success of cloud computing in enterprise environment, the inventors of the instant application anticipate that organizations will start adopting cloud computing to form a "Virtual Organization," in which the enterprise environment may be able to leverage resources with suppliers and business partners and integrate business processes within the Virtual Organization. The inventors of the instant application have recognized that a possibility exists for business-to-business (B2B) solutions over the cloud, where each partner forms an entity within a Virtual Organization, providing for the sharing of data, sharing of CPU cycles, sharing of solutions, and possible sharing of costs as well. Customers may benefit by focusing on their core business and/or competencies, e.g., rather than worrying about "non-core" or fringe problems associated with infrastructure and/or integration issues. The cost of ownership may also be reduced via the kinds of Virtual Organizations imagined herein, making them more affordable to small and medium enterprises (SMEs). Furthermore, providing an integration server of the type offered by the assignee of the instant invention over the cloud to offer B2B solutions may help optimizations that the cloud may offer through parallel processing to be realized, reduce time to market, and enable flexible up and down scalability.

Given the concept of the Virtual Organization, it is possible that there could be sharing among and/or between different partners in the Virtual Organization in terms of resources that could include, for example, CPU cycles, disk space, executables, etc. MapReduce is an algorithm that helps build algorithmic constructs so that a task can be divided and distributed by a master onto different slave machines. Algorithms such as MapReduce involve the transfer of executables between machines, which the inventors of the instant application have recognized could be extended to partners crossing over organizational boundaries. In other words, with the advent of cloud computing, different organizations could partner to form a Virtual Organization and use optimizations such as MapReduce algorithms to reduce expenses, improve performance, etc.

Unfortunately, however, there are concerns with security restrictions, configurations, enforcements, etc., that are raised, for example, while executing executables from partners. The inventors believe that current cloud computing providers, independent researchers/organizations, and others unfortunately have not looked into such concerns.

Conventional cloud-based service providers have tackled security from the perspective of Access Controls to services offered on the cloud. Current offerings typically are in line with what Microsoft Azure provides, namely, where access to particular services is decided primarily against tokens issued by Access Control services. However, these security mechanisms do not take into account the sharing of resources to the extent that might ultimately become possible and to the extent visualized herein, e.g., in connection with Virtual Organizations. Indeed, conventional approaches to providing security in the cloud do not extend themselves to scenarios where the CPU cycles are to be shared through executables run on a partner's instance, for example. Finer grained controls and enforcement also are not currently possible.

Thus, it will be appreciated that there is a need in the art for improved security techniques for cloud computing especially, for example, where multiple organizations for a single Virtual Organization, e.g., to share the processing of executables.

One aspect of certain example embodiments relates to security techniques for Virtual Organizations involving, for example, multiple separate organizations coming together in a cloud computing environment to CPU cycles, disk space, and even executables, for instance.

Another aspect of certain example embodiments relates to the extension of cloud computing to different types of partner collaborations such as, for example, CPU cycle sharing.

Another aspect of certain example embodiments relates to fine grained security controls and enforcement techniques.

Still another aspect of certain example embodiments relates to a more seamless integration of B2B domain concepts, e.g., where security configurations are captured between partners as a part of partners' agreement.

In certain example embodiments, a computer-implemented method in a cloud computing environment including at least first and second partners that share a distributed file system is provided. One or more Trading Partner Agreements (TPAs) are negotiated between two or more of the at least first and second partners. Each said TPA specifies any resources allocated by the partners in the TPA, a transport protocol to be used by the partners in the TPA, and a security mechanism to be used by the partners in the TPA. A security policy is formed from the TPAs. Such activities may be performed at design time in certain example embodiments. At run time, the method may further comprise, for example, running an algorithm to determine a target partner or target partner instance to which an executable from a source partner or source partner instance is to be distributed; transferring the executable to the target partner or target partner instance in accordance with a TPA negotiated between the target partner or target partner instance and the source partner or source partner instance; and invoking the executable on the target partner or target partner instance within constraints specified by the security policy.

In certain example embodiments, a cloud computing system is provided. The system includes a plurality of partner servers and/or partner server instances. A distributed file system is shared by the plurality of partner servers and/or partner server instances. A software module comprises an algorithm that, when executed, determines a target partner server or target partner server instance to which an executable from a source partner server or source partner server instance is to be distributed. One or more Trading Partner Agreements (TPAs) are negotiated between two or more of the plurality of partner servers and/or partner server instances. Each said TPA specifies any resources allocated by the partner servers and/or partner server instances that are a party to the TPA, a transport protocol to be used by the partner servers and/or partner server instances that are a party to the TPA, and a security mechanism to be used by the partner servers and/or partner server instances that are a party to the TPA. A security policy is formed from the TPAs. The source partner server or source partner server instance includes a first processor configured to cause the executable to be transferred to the target partner server or target partner server instance in accordance with a TPA negotiated between the target partner server or target partner server instance and the source partner server or source partner server instance. The target partner instance or target partner instance includes a second processor configured to invoke the executable, once received, on the target partner instance or target partner instance, within constraints specified by the security policy.

In certain example embodiments, a computer-implemented method for sharing resources among and/or between partners in a virtual organization is provided. The partners adhere to Trading Partner Agreements (TPAs) negotiated between at least two of said partners in the virtual organization. An algorithm is run to determine a target partner server or target partner server instance to which an executable from a source partner server or source partner server instance is to be distributed. The executable is transferred to the target partner server or target partner server instance in accordance with a TPA negotiated between the target partner server or target partner server instance and the source partner server or source partner server instance. The executable is invoked on the target partner server or target partner server instance within constraints specified by a security policy, the security policy including each said TPA. The TPA specifies: any resources allocated by the partners in the TPA, a transport protocol to be used by the partners in the TPA, and a security mechanism to be used by the partners in the TPA.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 2 is a sample Trading Partner Agreement (TPA) format that can be used for capturing an agreement between parties in accordance with certain example embodiments;

DETAILED DESCRIPTION OF EXAMPLE EMBODIMENTS OF THE INVENTION

The MapReduce algorithm is a distributed processing algorithm that relies on the divide and conquer paradigm seen in many computer algorithms. Thus, when partners in a Virtual Organization for instance exist as entities in the cloud, the Integration Server B2B offerings may make use of MapReduce algorithm, for example, to reduce processing time (e.g., make B2B solutions perform better), save costs (e.g., by bringing along optimizations that stem from sharing space/CPU cycles amongst the partners), etc.

A paradigm shift made possible via the MapReduce algorithm involves transferring the executable to wherever it could be considered advantageous over a transfer of data. Like in many of B2B scenarios, the size of the data to be transferred may sometimes reach into the gigabytes or even higher. Such situations may warrant the transfer of executables, if the partner platforms can host the executables.

Figure 1:
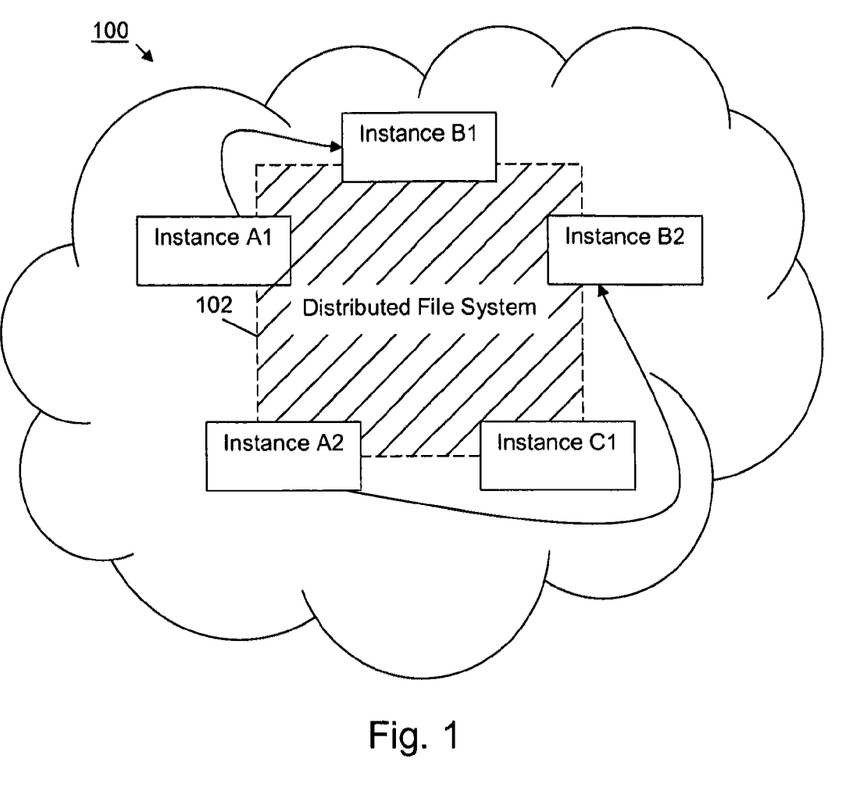
FIG. 1 is a schematic view illustrating one example of how execution can be delegated among multiple partners in a Virtual Organization in accordance with certain example embodiments.

FIG. 1 is a schematic view illustrating one example of how execution can be delegated among multiple partners in a Virtual Organization in accordance with certain example embodiments. The Virtual Organization exists within the cloud 100 and includes partners A, B, and C. Partners A, B, and C have multiple instances running in the FIG. 1 example and, more particularly, instances A1 and A2 belongs to partner A, instances B1 and B2 belong to partner B, and instance C1 belongs to partner C. Of course, it will be appreciated that more or fewer partners and/or instances may be provided in different implementations. The instances share a common distributed file system 102. In other words, the distributed file system 102 may essentially span the instances owned by the partners in the cloud. The distributed file system 102 may include, for example, computer readable storage media in any suitable form, a directory structure, files, etc. Such storage locations may be accessible via network addressing protocols, etc. The distributed file system 102 may be a heterogeneous structure in certain example embodiments, e.g., because it may comprise structural elements from plural, different partners. The arrows from instance A1 to instance B1, and from instance A2 to instance B2 represent executable transfers from partner A to partner B.

In the FIG. 1 example scenario, partner A runs processing logic against data that exists in distributed file system 102 over instance A1, instance A2, instance B1, instance B2, and instance C1. This logic is capable of running on any of the instances in the cloud 100 when MapReduce is enabled. An example "best case" scenario is that it runs on all of the instances that host the data as a part of the distributed file system 102. In such a case, instead of moving the entire data (which still may be accessible through the distributed file system 102) from the distributed file system 102 to instance A1, the implementation dispatches the executable (package).

One potential problem with this scenario is the host of security issues that might arise from the fact that the partner B instances are allowing the executable that had been a part of the partner A instances to run within its environment. For instance, it would be desirable for partner B to reduce the likelihood of the execution of malicious code that could, for example, delete its local files, change configurations, etc. Because the code will be downloaded from the partner A runtime, partner B has to contemplate mechanisms to specify the restraints that need to be adhered to at runtime.

Although not shown in FIG. 1, each partner server or partner server instance may include at least one processor. The processors may be configured to facilitate participation in the negotiating of TPAs, run the MapReduce and/or other algorithms, cause the packaging and/or transmission of an executable, handle the receipt and/or subsequent execution of a received executable, etc. For example, when an executable is to be executed, a particular source partner server or partner server instance may, for example, run the MapReduce algorithm to determine which other partner server or partner server instance the executable is to be run on, package the executable (see the description below for example details on how this may be performed), and cause the package to be sent in accordance with the relevant TPA(s). At the target partner server or partner server instance, the processor may help to receive package and execute it in accordance with the relevant TPA(s).

Although certain example embodiments have been described in connection with the MapReduce algorithm, it will be appreciated that the techniques described herein may be applied to virtually any case where a transfer of an executable between two or more partners may be considered advantageous over the transfer of data.

Certain example embodiments address this and/or other kinds of security problems, e.g., in cloud computing environments. More particularly, certain example embodiments relate to techniques for establishing trust between collaborating parties. Syntax may be captured and used to quantify the trust in terms of "allowed" activities on the system. The artifact produced is referred to herein as a Trading Partner Agreement (TPA), and is discussed in greater detail below. Certain example embodiments also relate to the architectural support provided from the integration server to honor the agreement(s) that is/are reached between partners.

Although cloud computing raises a number of business opportunities at different levels—including infrastructure, platform, and software as a service levels—one challenge to its integration relates to the question of how to ensure trustful interoperability between two or more parties (e.g., that may in certain example instances procure application software and run-time support software from different vendors and host them in the cloud). To address this issue, there is a need for business entities involved in a Virtual Organization to reach an accord, which sometimes are referred to as Service Level Agreements (SLAs). SLAs provide the feasibility of giving varied levels of permissions to partners based on business requirements and/or other factors. For example, just as applications have different levels of access for administrators, registered users, and guest users, SLAs may sometimes provide a way to distinguish for partners what actions are permitted for the executables from them.

The exchange of executables between two partners within a Virtual Organization may apprise each partner of the other partner's role in the Virtual Organization, as well as the technology details about how the other partner sends and receives messages, hosts executables, etc. In some cases, it may be desirable for the two partners to reach agreement on some of these details.

An agreement can be reached in any suitable way. For instance, in certain example embodiments, based on the capabilities that an entity can leverage from its partner, both the entity and its partner are involved in negotiating the terms and conditions, and the ground rules for collaboration are laid-down. FIG. 2 is a sample TPA format that can be used for capturing an agreement between parties in accordance with certain example embodiments. The FIG. 2 example format shows a sample agreement between partners SAG-B2B20100112 and MIG-B2B19970243. The security tag is a representative structure to how security related restrictions could be captured in a TPA. The security tag specifies that the transport to be used is HTTPS. The SAG-B2B20100112 partner, for example, supports digital signature authentication according to the MD5 algorithm, with keys being issued by VeriSign. Code levels are set for files and sockets, with acceptable actions being specified. Similar information is provided for the MIG-B2B19970243 partner.

Negotiations may, for example, occur in real time, e.g., between human users interacting with one another via their respective partner servers or partner server instances. Alternatively, or in addition, users may pre-program their respective partner servers or partner server instances with rules regarding the types of resources to be shared, the terms and conditions upon which they may be shared, etc. A user may also program ordered preferences (e.g., try 256 bit encryption first, then drop to 128 bit encryption, etc.; the HTTPS protocol is more important than digital signatures; obtaining more CPU cycles is more important than giving up lots of storage space; and/or the like). An automatic negotiation may then take place between two partner servers or partner server instances. Such an automatic negotiation may attempt to develop the most secure networks. Alternatively, or in addition, such an automatic negotiation may attempt to achieve an agreement that maximizes the utilities of each partner. This process may occur when a Virtual Organization is first setup, when new partners join a Virtual Organization, when partners exit a Virtual Organization, etc.

Figure 3:
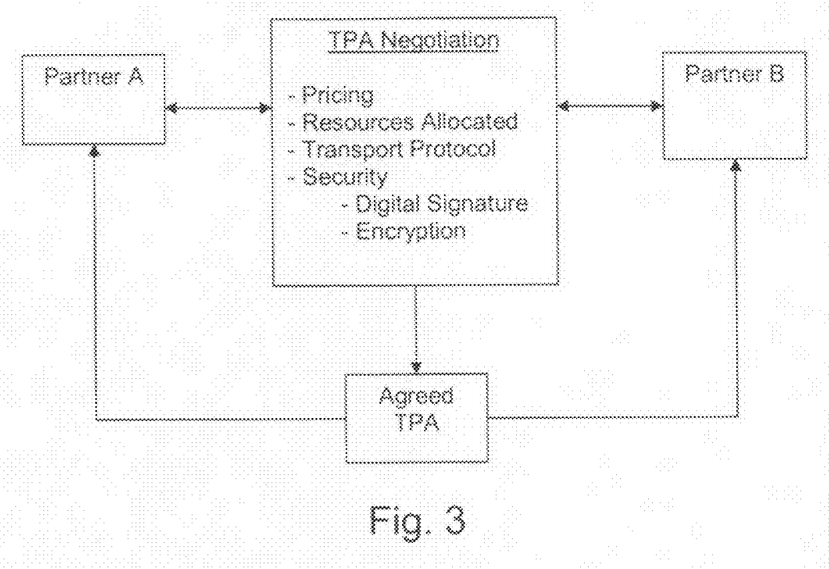
FIG. 3 is a schematic view illustrating how two different parties form a TPA in accordance with certain example embodiments.

Once the TPA is created, the partners import the same into their respective systems. This TPA is used for different transactions, as discussed in greater detail below. In the meantime, FIG. 3 is a schematic view illustrating how two different parties form a TPA in accordance with certain example embodiments. As shown in FIG. 3, partners A and B negotiate and come to a common understanding. The common understanding is expressed as a TPA. The TPA covers terms and conditions including, for example, pricing, the number and types of resources allocated, the transport protocol to be implemented, the type of security to be used (e.g., digital signatures, encryption, etc.), and/or the like. Of course, the TPA may be expanded to cover more and/or different terms and conditions for two or more parties in different example embodiments. Once an agreement is reached, the agreed TPA is sent back to each partner that is a party to the agreement in certain example embodiments, to all partners in the Virtual Organization, etc. In certain other example embodiments, a central TPA repository may be maintained, e.g., within the distributed file system.

The security architecture support may in certain example embodiments be facilitated by virtue of the integration server, e.g., to address certain concerns. One example concern relates to helping to ensure that the transfer of executables allows for the testing of the integrity of the executable. This may in certain example instances refer to verifying that the executable was not altered during the transit among and/or between the integration server instances (e.g., from partner A integration server instance A1 to partner B integration server instance B1). Another example concern relates to helping to ensure that the transfer of executables allows for the testing of the authenticity of the executable. This may in certain example instances refer to verifying that the executable was actually sent by the partner who claims to have sent it. It will be appreciated that these example concerns may be addressed by, for example, signing the content of the executable. Still another example concern relates to restricting the executable to work within the rules set by the relevant TPA(s). For instance, the TPA may specify that the executable can only use resources of or on the target partner server or target partner server instance (e.g., files, number/frequency of CPU cycles, storage space, etc.) as specified in the TPA negotiated between the target partner server or target partner server instance and the source partner server or source partner server instance.

Figure 4:
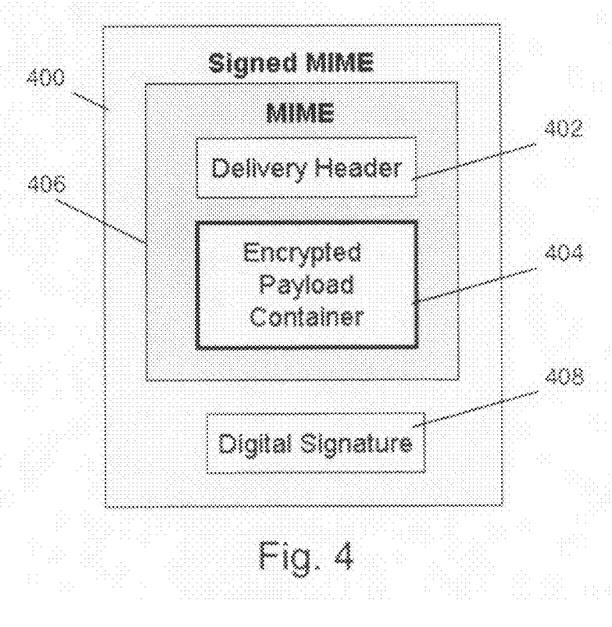
FIG. 4 is a schematic view of a signed MIME message 400 for executable transfer in accordance with certain example embodiments.

The transfer of executables across partners may be performed in a secured manner in certain example embodiments. For instance, the whole document may be a MIME multipart/related message (e.g., in accordance with RFC 2387). FIG. 4 is a schematic view of a signed MIME message 400 for executable transfer in accordance with certain example embodiments. The whole document 400 in the FIG. 4 example is a multipart MIME message containing various body parts. As seen in FIG. 4, the multipart MIME message contains a delivery header and payload container sections 402 and 404. The whole document 400 is packaged into a MIME multipart/related message (e.g., in accordance with see RFC 2387).

The delivery header 402 may include sender/receiver details with their identifications and the type of document being sent. The delivery header 402 also may aid in the recognition of the participants in the executable transfer, as well as the right certificates for verifying and decrypting. In other words, the delivery header 402 may have all of the information about the sender and receiver, e.g., to help in understanding user details and also in picking the right certificates for verifying and decrypting the documents. The delivery header 402 also may contain a unique identifier to identify the message and also have the message-digest value for the message.

The overall message 400 also may include a payload container 404. The payload container 404 may contain the payload and an (executable) attachment. The payload itself may contain details about the attachment(s) (e.g., number of attachments), a message digest of the MIME message and algorithm used in its creation (e.g., MD5, SHA-1, etc.), etc. The latter may in certain instances help indicate whether the message is correct, that changes have not been made during the file transfer, etc.

In certain example embodiments, the payload container 404 may instead or in addition include service content, an attachment section, and a message digest section. The service content may include the description about the attached executable (e.g., file name, type, content-id, etc.) and also specify the access rights for the specific executable (e.g., an XML schema for the same). If there are multiple integration server packages in the attachment section, they may be listed in order of dependencies. The attachment section may contain the actual executable or integration server packages. The message digest section may include the message digest and an algorithm user to confirm that the attachment has not been changed during the document/file transfer.

Once the MIME multipart/related message 406 is created, additional actions optionally may be performed on it depending, for example, upon the desired level of security. For example, the payload may be encrypted and a plain attachment may be allowed in certain example embodiments. In certain example embodiments, both the payload and the attachment may be encrypted. In certain example embodiments, the document 406 may be signed (e.g., with the above options), for instance, by including a digital signature 408. The signed body would be a SMIME body 400 on top of MIME multipart/related message 400, e.g., as shown in connection with the FIG. 4 example. As alluded to above, the FIG. 4 example is signed with a digital signature 408 and has an encrypted payload and attachment 404.

TN and/or IS services may be used to create the MIME multipart/related messages and/or an SMIME object. The SMIME message may be sent to a receive service in a predefined integration server package that will authenticate the user by verifying provided public certificates. The sender and receiver information may be fetched from the delivery header information, and this may be used to pick the right certificates/keys to decrypt the payload container and fetch the payload and the attachment. The receive service may then deploy the decrypted package on the receiver's integration server instance (e.g., where the receive service is residing).

Figure 5:
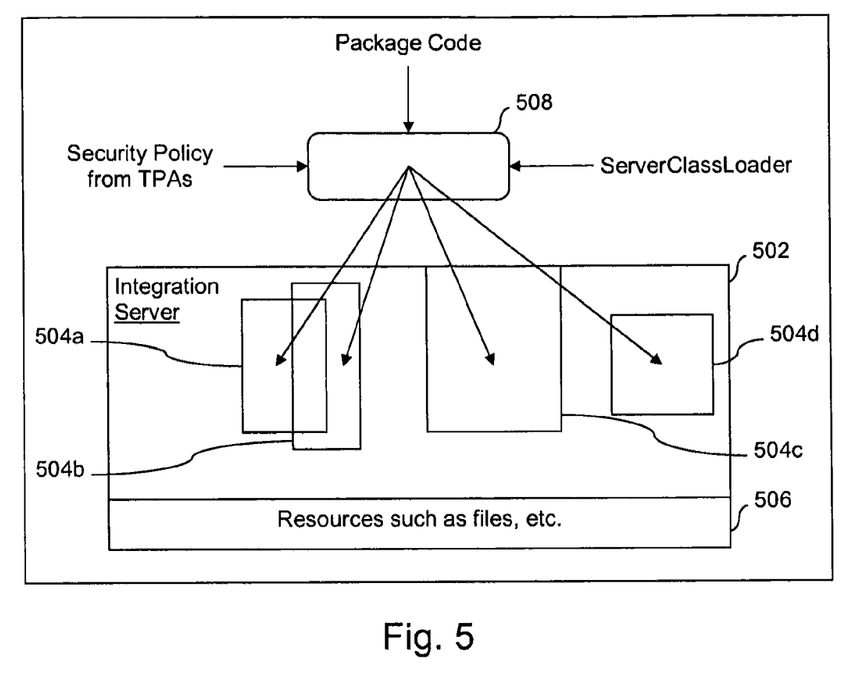
FIG. 5 is an example integration server security architecture in accordance with certain example embodiments.

FIG. 5 is an example integration server security architecture in accordance with certain example embodiments. The package codes may run with different permissions. FIG. 5 helps demonstrate how TPAs may be enforced in connection with certain example embodiments. In certain example embodiments, there is no built-in notion of trusted code, e.g., along the lines of Java security. The security policy for the entire integration server may be viewed as the sum total of policies specified through all of the Trading Partner Agreements.

The ServerClassLoader may be implemented in certain example embodiments as an instance of the SecureClassLoader. It may be used to attach a CodeSource instance to the classes loaded under the package. The CodeSource instance may identify the partner and keep an array of certificates (e.g., configured against the partner) that had been used to verify the package/executable in the SMIME message.

The following is a Java-like code example for an entry in the security policy that grants read/write/execute permission on all the files in the directory /dfs/ to the code that is identified with Sid:

```
grant signedBy "Sid" {
    permission java.io.FilePermission "/dfs/*", "read,write,execute";
};
```

As alluded to above, the security policy for the entire integration server may be the collection of entries such as the one mentioned above compiled, for example, from all of the Trading Partner Agreements. In other words, in certain example embodiments, the security policy file may be an element that is owned by the integration server's Java runtime. Thus, in certain example embodiments, it may not be accessible to the partners. By contrast, the TPAs may be the only artifacts that are shared between the partners, and the security policy will be shaped based on the agreed-upon TPAs.

In an example scenario, party A will have a TPA1 with partner B, and party A will have a TPA2 with partner C. The security policy for the integration server with party A will not be made accessible to partner B or C. However, the security policy does capture the security aspects from the corresponding TPAs. Thus, the TPAs (and not the security policy for the integration server) are the ones that could be made available through central repository (e.g., distributed file systems) in this example scenario.

As alluded to above, in certain example embodiments, the security policy may be maintained in a central repository, e.g., in the distributed file system. However, in certain other example embodiments, the security policy may be maintained by each partner. In still other example embodiments, the security policy for a given partner may be the collection of TPAs relevant to that particular partner, and this more customized security policy may be stored in a central location, at the relevant partner(s), etc. An example of the security policy when captured in a file may be similar to the following Java-like code example:

```
keystore "\keystore\partnerKeystore", "JKS";
grant signedBy "Sid" {
    permission java.io.FilePermission "/dfs/*", "read,write";
    permission java.net.SocketPermission "204.160.241.99" "accept";
};
grant signedBy "Vikram"{
    permission java.io.FilePermission "/dfs/*", "read,write,delete";
    permission java.net.SocketPermission "204.160.241.105"
"accept,connect";
};
```

The keystore specified above is a repository of certificates/private keys of all the trading partners.

Permissions may be predefined (e.g., Java-defined) permissions. Alternatively, or in addition, permissions may be built to specific requirements for the integration server. Java provides the following example permissions, which may be used in connection with certain example embodiments:

java.io.FilePermission—specifies the read/write/delete/execute permissions for files. This permission may be used to restrict the access to files in the distributed file systems.

java.net.SocketPermission—specifies the level of access to the network via sockets.

Custom-built integration server permissions may be used to check access to the administrative APIs. Examples include:

Services changing the server configuration;

Services creating new integration server artifacts or Namespace objects; and     Services restarting/stopping the integration server.

Other services may allow for the execution of a task through a Server Thread Pool. Corresponding permissions may, for example, control the number of tasks that the partner's executable (integration server package) can run at a time, etc.

Under the example integration server security architecture shown in FIG. 5, the code that needs to be sensitive to the security policies may be able to perform the relevant checks. An example is provided in the following Java-like code snippet:

```
FilePermission perm = new FilePermission("path/file", "read");
AccessController.checkPermission(perm);
```

This code snippet checks whether the calling code has enough permissions to have read access to the file specified by "path/file".

Given the above, and referring once again to FIG. 5, it can be seen that an integration server 502 is provided for the Virtual Organization. The integration server 502 for the virtual organization includes plural instances 504a-d for plural partners in the Virtual Organization. These instances 504a-d share resources 506, which may include files and/or the like. A message 508 is sent to the instances 504a-d, as appropriate. The message 508 includes the package code (e.g., the executable), as well as the security policy (e.g., the total of all TPAs) and the classes needed to execute the executable in the package code (e.g., from the ServerClassLoader).

Figure 6:
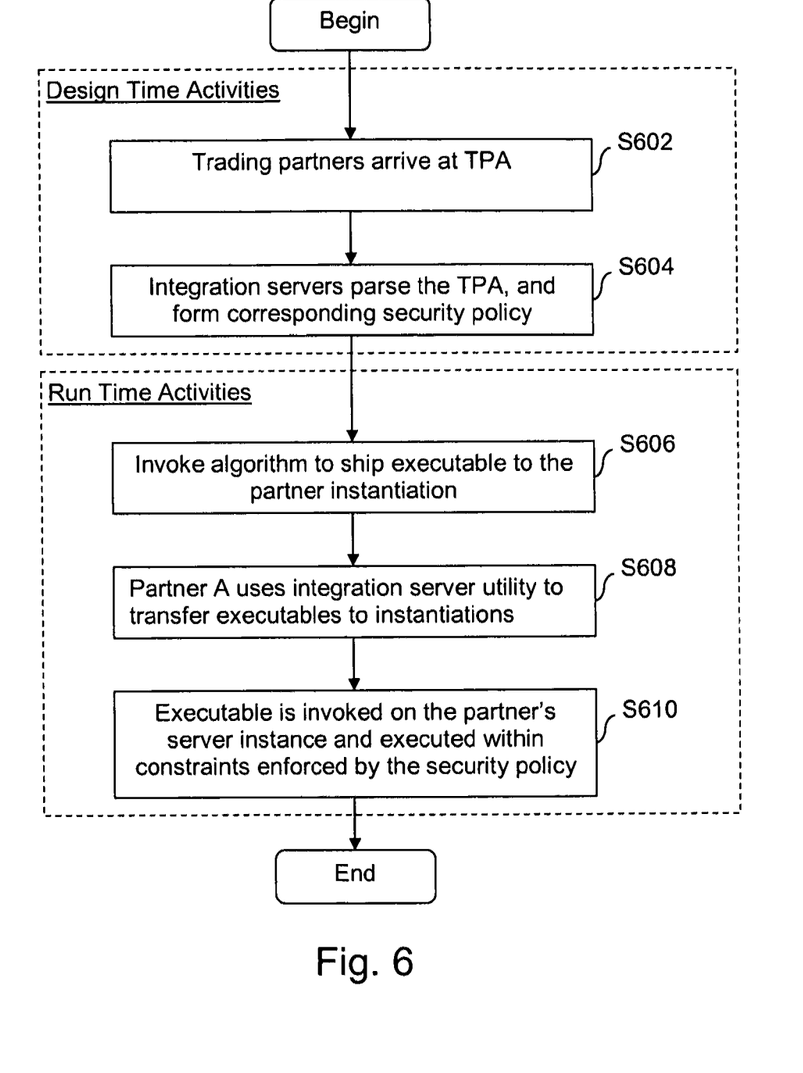
FIG. 6 is an example flowchart illustrating design time and run time activities for certain example embodiments.

FIG. 6 is an example flowchart illustrating design time and run time activities for certain example embodiments. In step S602, the trading partners (e.g., partners A, B, and C) arrive at a Trading Partner Agreement (TPA). The TPA may help specify the rules guarding the execution of executables on the various partner systems. Partner B could have come to agreements with partner A and partner C, for example. The terms and conditions of the agreements may be configured through TN and/or integration server interfaces an ultimately captured as individual TPAs. In step S604, the integration server implementation parses the TPA files corresponding to all of the trading partners with which it has a TPA. For instance, the integration server implementation for partner B may parse TPAs that partner B has with partners A and C. Partner B may form a security policy for its instance of the integration server, e.g., as the combined set of parsed TPAs that it has with other partners.

In step S606, MapReduce or some other appropriate algorithm is run to determine where executables are to be shipped. For example, when a task issued at partner A's integration server instance is to be MapReduced, per the MapReduce algorithm, it is determined that the task from partner A is to be executed on partner B's integration server instances and partner C's integration server instance. In step S608, the executable that is to be executed on the slaves in the cluster is shipped. In this example, the partner A executable is shipped to partner B's integration server instances and partner C's integration server instances. As indicated above, this transfer of executables may be accomplished using SMIME messages. See, for example, the discussion in connection with FIG. 4 above.

The receive service at Partner B's Integration Server is invoked while the executable (integration server packages) is transferred. The receive service verifies the executable and authenticates partner A. The receive service also modifies the manifest of the package to add the authenticated partner information to it. The receive service deploys the package on the integration server at partner B, as well. The same will happen at partner C's integration server instance in this example.

The executable is invoked on the partner's server instance and executed within constraints enforced by the security policy in step S610. The integration server's ServerClassLoader, which may be a SecureClassLoader instance, loads the classes in the package obtained from the partner. A CodeSource instance (carrying the partner's certificates) also may be attached while loading the Java classes. The execution of the Java classes may be checked against the permissions configured for the partner in the security policy files. This helps ensure that the code execution abides by the rules specified in the Trading Partner Agreement.

Although certain example embodiments have been described in relation to the sharing of executable, it will be appreciated that the example techniques described herein may be used in connection with other documents including, for example, data and/or the like. In such cases, the permissions and/or other security attributes that are negotiated in the TPAs may be varied. Also, although certain example embodiments have been described herein as relating to two partners sharing one TPA, it will be appreciated that any number of partners may share any number of TPAs.

U.S. Publication No. 2010/0115046 (incorporated herein by reference) describes techniques for MapReducing the processing of large documents, e.g., Electronic Data Interchange (EDI) documents, and may be used in connection with certain example embodiments described herein. For instance, a document may be mapped into a plurality of intermediate documents, the intermediate documents may be processed to produce a plurality of intermediate results, the plurality of intermediate results may be reduced to produce a plurality of reduced intermediate results, and the reduced intermediate results may be reduced to produce a final result representing the processed document.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer-implemented method in a cloud computing environment including at least first and second partners that share a distributed file system, wherein:
   one or more Trading Partner Agreements (TPAs) are negotiated between two or more of the at least first and second partners, each said TPA specifying:
     any resources allocated by the partners in the TPA,
     a transport protocol to be used by the partners in the TPA, and
     a security mechanism to be used by the partners in the TPA; and
   wherein a security policy is formed from the TPAs,
   the method comprising:
     transferring, using a computing system of the cloud computing environment, an executable to the target partner or target partner instance in accordance with a TPA negotiated between the target partner or target partner instance and the source partner or source partner instance; and
     invoking the executable on the target partner or target partner instance within constraints specified by the security policy.

2. The method of claim 1, wherein the security policy is accessible by each said partner.

3. The method of claim 1, wherein each said TPA is negotiated and packaged according to an XML schema.

4. The method of claim 1, wherein the TPAs are negotiated and the security policy is formed at design time.

5. The method of claim 1, wherein the security mechanism specifies that a digital signature and/or encryption is/are to be used.

6. The method of claim 1, wherein the security mechanism specifies permissions for any of the allocated resources.

7. The method of claim 6, wherein the resource is a file or file system and the permissions for the file or file system include at least one of read, write, and execute action permissions.

8. The method of claim 6, wherein the resource is a socket and the permissions for the socket include accept connect action permissions.

9. The method of claim 1, further comprising:
   running an algorithm to determine a target partner or target partner instance to which an executable from a source partner or source partner instance is to be distributed.

10. The method of claim 1, further comprising defining a multipart message, the multipart message including:
   a header including sender and receiver information, and
   a payload container containing the executable to be transferred and rights associated with the executable to be transferred.

11. The method of claim 10, further comprising packaging into a first message the header and payload container.

12. The method of claim 11, wherein the first message is signed in accordance with the TPA negotiated between the target partner or target partner instance and the source partner or source partner instance, the signature and the first message being packaged together into the multipart message.

13. The method of claim 12, further comprising encrypting at least a portion of the payload container in accordance with the TPA negotiated between the target partner or target partner instance and the source partner or source partner instance.

14. The method of claim 13, wherein the multipart message is an SMIME message.

15. A cloud computing system, comprising:
   a plurality of partner servers and/or partner server instances;
   a distributed file system shared by the plurality of partner servers and/or partner server instances; and
   a software module comprising an algorithm that, when executed, determines a target partner server or target partner server instance to which an executable from a source partner server or source partner server instance is to be distributed, wherein:
   one or more Trading Partner Agreements (TPAs) are negotiated between two or more of the plurality of partner servers and/or partner server instances, each said TPA specifying:
     any resources allocated by the partner servers and/or partner server instances that are a party to the TPA,
     a transport protocol to be used by the partner servers and/or partner server instances that are a party to the TPA, and
     a security mechanism to be used by the partner servers and/or partner server instances that are a party to the TPA;
   wherein a security policy is formed from the TPAs;
   wherein the source partner server or source partner server instance includes a first processor configured to cause the executable to be transferred to the target partner server or target partner server instance in accordance with a TPA negotiated between the target partner server or target partner server instance and the source partner server or source partner server instance; and
   wherein the target partner server or target partner server instance includes a second processor configured to invoke the executable, once received, on the target partner server or target partner server instance, within constraints specified by the security policy.

16. The cloud computing system of claim 15, wherein each said TPA is negotiated and packaged according to an XML schema.

17. The cloud computing system of claim 15, wherein the security mechanism specifies that a digital signature and/or encryption is/are to be used.

18. The cloud computing system of claim 15, wherein the security mechanism specifies permissions for any of the allocated resources.

19. The cloud computing system of claim 15, wherein the first processor is further configured to define a multipart message, the multipart message including:
 a header including sender and receiver information, and
 a payload container containing the executable to be transferred and rights associated with the executable to be transferred.

20. The cloud computing system of claim 19, wherein the first processor is further configured to:
 package into a first message the header and payload container, and
 sign the first message in accordance with the TPA negotiated between the target partner server or target partner server instance and the source partner server or source partner server instance, the signature and the first message being packaged together into the multipart message.

21. The cloud computing system of claim 19, further comprising encrypting at least a portion of the payload container in accordance with the TPA negotiated between the target partner server or target partner server instance and the source partner server or source partner server instance.

22. The cloud computing system of claim 15, wherein the multipart message is an SMIME message.

23. A computing system for sharing resources among and/or between partners in a virtual organization, the partners adhering to Trading Partner Agreements (TPAs) negotiated between at least two of said partners in the virtual organization, the computer system:
 a memory; and
 a processing system that includes at least one processor that is coupled to the memory, the processing system configured to:
  run an algorithm to determine a target partner server or target partner server instance to which an executable from a source partner server or source partner server instance is to be distributed;
  transfer the executable to the target partner server or target partner server instance in accordance with a TPA negotiated between the target partner server or target partner server instance and the source partner server or source partner server instance; and
  invoke the executable on the target partner server or target partner server instance within constraints specified by a security policy, the security policy including each said TPA,
 wherein the TPA specifies:
  any resources allocated by the partners in the TPA,
  a transport protocol to be used by the partners in the TPA, and
  a security mechanism to be used by the partners in the TPA.

24. The computing system of claim 23, wherein the constraints specified by the security policy help ensure that the executable was not altered during transmit among and/or between partner servers and/or partner server instances.

25. The computing system of claim 23, wherein the constraints specified by the security policy help ensure that the executable was sent by the partner that claims to have sent it.

26. The computing system of claim 23, wherein the constraints specified by the security policy help ensure that the executable can only use resources of or on the target partner server or target partner server instance as specified in the TPA negotiated between the target partner server or target partner server instance and the source partner server or source partner server instance.

* * * * *